United States Patent
Dolt et al.

(10) Patent No.: US 7,319,478 B2
(45) Date of Patent: Jan. 15, 2008

(54) SOLID-STATE VIDEO CAMERA AND METHOD FOR BRIGHTNESS CONTROL

(75) Inventors: Martin Dolt, Knittlingen (DE); Michael Vögele, Kämpfelbach-Ersingen (DE)

(73) Assignee: Richard Wolf GmbH, Knittlingen (DE)

( * ) Notice: Subject to any disclaimer, the term of this patent is extended or adjusted under 35 U.S.C. 154(b) by 793 days.

(21) Appl. No.: 10/406,966

(22) Filed: Apr. 4, 2003

(65) Prior Publication Data

US 2003/0189663 A1 Oct. 9, 2003

(30) Foreign Application Priority Data

Apr. 4, 2002 (DE) ................................ 102 14 809

(51) Int. Cl.
A61B 1/04 (2006.01)
H04N 9/68 (2006.01)
H04N 3/14 (2006.01)
H04N 5/238 (2006.01)

(52) U.S. Cl. .................... 348/45; 348/234; 348/294; 348/364; 348/365

(58) Field of Classification Search ............... 348/362, 348/364, 365, 363, 294, 296, 302, 308, 361, 348/273, 223.1, 222.1, 272, 229.1, 234, 228.1; 250/208.1

See application file for complete search history.

(56) References Cited

U.S. PATENT DOCUMENTS 4,929,824 A * 5/1990 Miyazaki .................... 382/274
5,416,515 A 5/1995 Arai et al.
5,831,676 A * 11/1998 Takahashi et al. .......... 348/362
2001/0010554 A1* 8/2001 Yoshida ...................... 348/312
2002/0036697 A1 3/2002 Mori et al.
2003/0189663 A1* 10/2003 Dolt et al. .................. 348/362

FOREIGN PATENT DOCUMENTS

| DE | 197 05 748 A1 | 8/1998 |
| EP | 0 964 584 A1 | 12/1999 |
| EP | 0 991 270 A1 | 4/2000 |
| JP | 2001285684 A1 | 10/2001 |

* cited by examiner

Primary Examiner—David Ometz
Assistant Examiner—Tuan Le
(74) Attorney, Agent, or Firm—Akin Gump Strauss Hauer & Feld LLP

(57) ABSTRACT

A solid-state video camera is equipped with pixel addition logic such that, if the measured object brightness falls below a certain threshold value, a brightening of the image is effected without increasing the noise component accepting a loss in real-time representation. The pixel addition by way of the pixel addition logic is coupled to the gain control of the camera in a manner such that, in each case, the gain control compensates for jumps in brightness which arise by way of the pixel addition and creates for the user a flowing transition without noticeable jumps in brightness.

17 Claims, 6 Drawing Sheets

Fig. 6:                    PRIOR ART
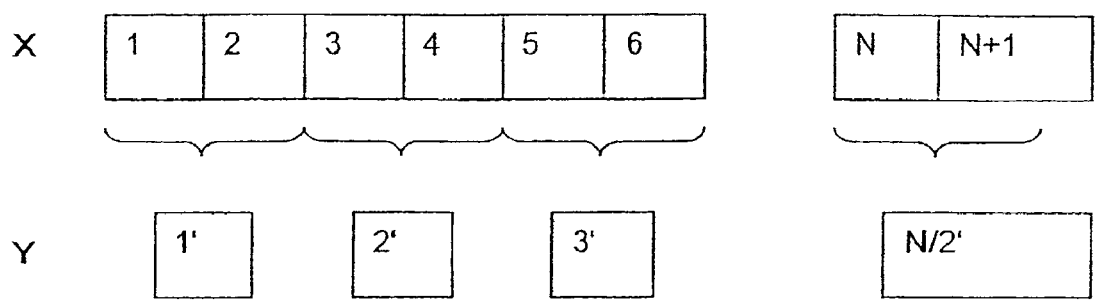
Fig 7:
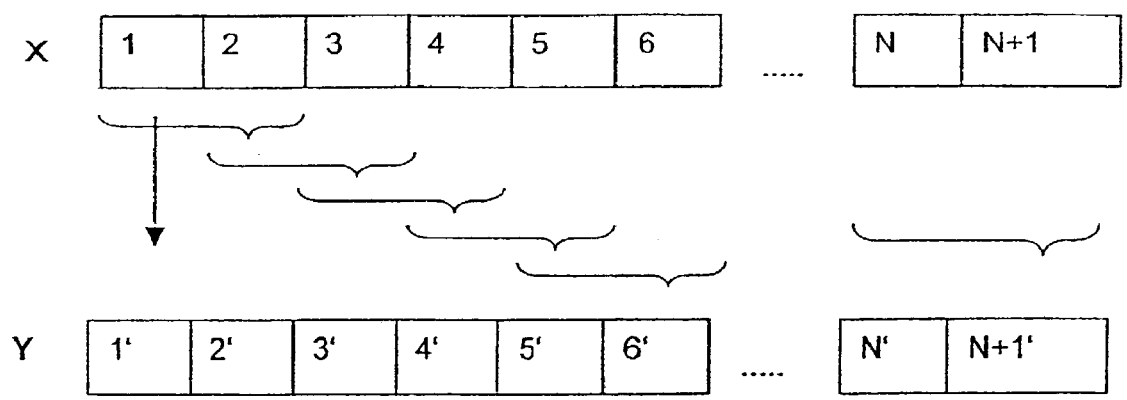

SOLID-STATE VIDEO CAMERA AND METHOD FOR BRIGHTNESS CONTROL

BACKGROUND OF THE INVENTION

The invention relates to a solid-state video camera having a brightness control unit which, on the basis of a measured brightness signal of a video picture or image, controls brightness of the image according to a nominal brightness value and has at least one brightness control mode (M1, M2, M3, M4). The invention also relates to a method for brightness control in a solid-state video camera wherein, using a video image recorded by a solid-state image sensor, a brightness signal of the image is obtained and brightness of the image is controlled to a nominal value on the basis of at least one brightness control mode (M1, M2, M3, M4).

Under unfavorable light conditions in medical and technical endoscopy, the applied endoscopic solid-state video camera generally changes from a shutter control mode, in which the exposure time of the pixels is controlled in steps, into a gain control mode, in which gain of the pixels is controlled. In order to permit sufficient image brightness in the gain control mode, gain factors are necessary which unavoidably result in noise on the resulting image. This noise has a negative effect on the image resolution and the recognition of detail. Furthermore it has a disturbing effect on the user.

In order to counteract this, some endoscopic solid-state video cameras have a so-called integration mode. In the integration mode, in a video frame sequence (2 frames at 1/50 second) the image sensor is not read twice, but only once, which corresponds to a doubling of the exposure time. When required, the exposure time may continue to be increased to a multiple of this frame exposure time. This procedure increases the brightness according to the number of integrated images without amplifying the noise component. The image repetition rate is, however, reduced accordingly. The reduction of the image repetition rate has the effect of slow-motion type jumps in the video. Additionally, moving objects appear significantly out of focus which is known to occur in photography when using slow shutter speeds.

Through the image integration the temporal and spatial resolution is thus lost with moving endoscopic sequences. In extreme cases meaningful endoscopy is no longer possible.

One example of a conventional solid-state video camera common in medical endoscopy, and the function of its brightness control, are explained with regard to the accompanying FIGS. 4 and 5. The conventional solid-state video camera shown in FIG. 4 as a block diagram, and indicated generally with reference numeral 20, comprises an image sensor 22, a CDS/gain unit 23, an A/D transducer 24, a digital signal processor 25, a time control unit 26, a micro-controller 28, a D/A transducer unit 31, a decoder 32 and output circuits 33.

The digital signal processor 25 of the known solid-state video camera 20 shown in FIG. 4 carries out digital video signal processing. The micro-controller 28 serves for camera control and, in combination with the signal processor, serves for brightness control. Additionally, in FIG. 4 there is shown an optional memory unit 27. This is necessary in case that a prolonged exposure is realized. The micro-controller 28 is in active connection with the digital signal processor 25, the memory unit 27, the time control unit 26 and the CDC/gain unit 23.

The brightness control of the video image of a solid-state video camera uses a reading gained from an adjustable measurement window in the video image by way of forming averages, peak value recognition, histogram evaluation or a combination of these methods for regulating the image brightness by way of continuous comparison to an adjustable nominal value.

The diagram shown in FIG. 5 schematically and graphically shows the course of the brightness control of a conventional endoscopic camera. On the left vertical axis of the diagram exemplary gain factors are plotted, and on the right vertical axis the shutter times are plotted. The horizontal axis indicates the (measured) object brightness in relative units.

The step function shown by way of an unbroken line is the control function in the shutter mode M2. The stepwise shutter control is, for example, effected in 6 dB steps. The step function of the shutter control M2 goes from a greater object brightness with a short shutter speed in the left part of the diagram up to the longest shutter speed 1/50 s (at NTSC standard 1/60 s). A further extension of the shutter speed is not possible with conventional video cameras.

So that the dynamics may be increased further, the gain of the camera sets in from a threshold value S2 of the object brightness. This so-called gain control mode M3 is drawn in by way of a dotted line in FIG. 5. As an option, as already drawn in FIG. 5, image integration may be activated earlier at a higher threshold value S3. This brightness control mode M4 is illustrated by a dot-dashed line in FIG. 5. The image integration is effected in 6 dB steps. In the diagram shown in FIG. 5 the image integration is limited by the control mode M4, for example, to four images. The gain function according to the brightness control mode M then begins to set in.

Not shown in FIG. 5 is a combination of shutter control (mode M2) and gain control (mode M3) wherein the jumps in brightness on account of the shutter control M2 are compensated by a gain control M3. It is likewise known to let the individual operating modes blend into one another in a flowing manner at the transition points.

BRIEF SUMMARY OF THE INVENTION

It is the object of the invention to make possible a solid-state video camera suitable for medical and technical endoscopy as well as a method of brightness control for the camera, such that the above outlined disadvantages of image integration and the increase of the noise component of the gain control may be avoided without losing real-time representation. Stated differently, it is the object of the invention to make available an additional brightness control mode for a solid-state video camera suitable for endoscopy which avoids the disadvantages of the gain control and image integration, and integrates this additional operating mode into the control of the camera.

According to the invention for increasing the image brightness or the sensitivity of an endoscopic solid-state video camera, the brightness information of adjacent pixels is grouped together and allocated to a new pixel. This increases the image brightness and additionally reduces the noise component in this pixel. For this it is suggested to couple the operating mode of "pixel addition" to the gain control of the camera in a manner such that the gain control in each case regulates the jumps in brightness which arise on account of the pixel addition, compensates for the pixel addition and creates a flowing transition without noticeable jumps in brightness to the user.

According to the invention, the gain with the jump into the addition operation is reduced, which, in addition to the noise-reducing effect of the addition, reduces the noise of the image, and thus further improves the image quality.

The operating mode "pixel addition" is known per se. This technique is used with progressive scan cameras and also with CMOS cameras for increasing sensitivity and is defined in the specification of these cameras under the term "pixel binning". With pixel binning the information of several pixels, e.g. in a horizontal or vertical direction, is grouped together and allocated to a new pixel. The resulting pixel matrix is smaller corresponding to the addition and has a lower resolution. However, the operation mode "pixel binning" is static, i.e. it may be switched on or off, but it is not integrated into a control algorithm.

An exemplary embodiment of this known "pixel binning" function is shown in FIG. 6. The line X by way of example represents a picture line of the original sensor information, and the line Y represents a picture line determined via 2-pixel binning. Evidently the pixel resolution is halved by way of this method.

In contrast to pixel binning, in the embodiment according to the invention, an uninterrupted pixel addition algorithm is preferably applied which does not rigidly add pixel groups, but groups together two or more adjacent pixels in the pixelwise course of the signal processing. Without limiting the general validity, one exemplary embodiment of a pair-wise pixel addition is represented in FIG. 7. An essential advantage of this embodiment is the fact that the resolution resulting from this manner of proceeding is only slightly less than the original image resolution, while the complete effect of increasing brightness of the image is achieved.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 6 is an example of a known "pixel-binning" function according to the prior art; and FIG. 7 is a pair pixel addition according to the present invention.

DETAILED DESCRIPTION OF THE INVENTION

Figure 1:
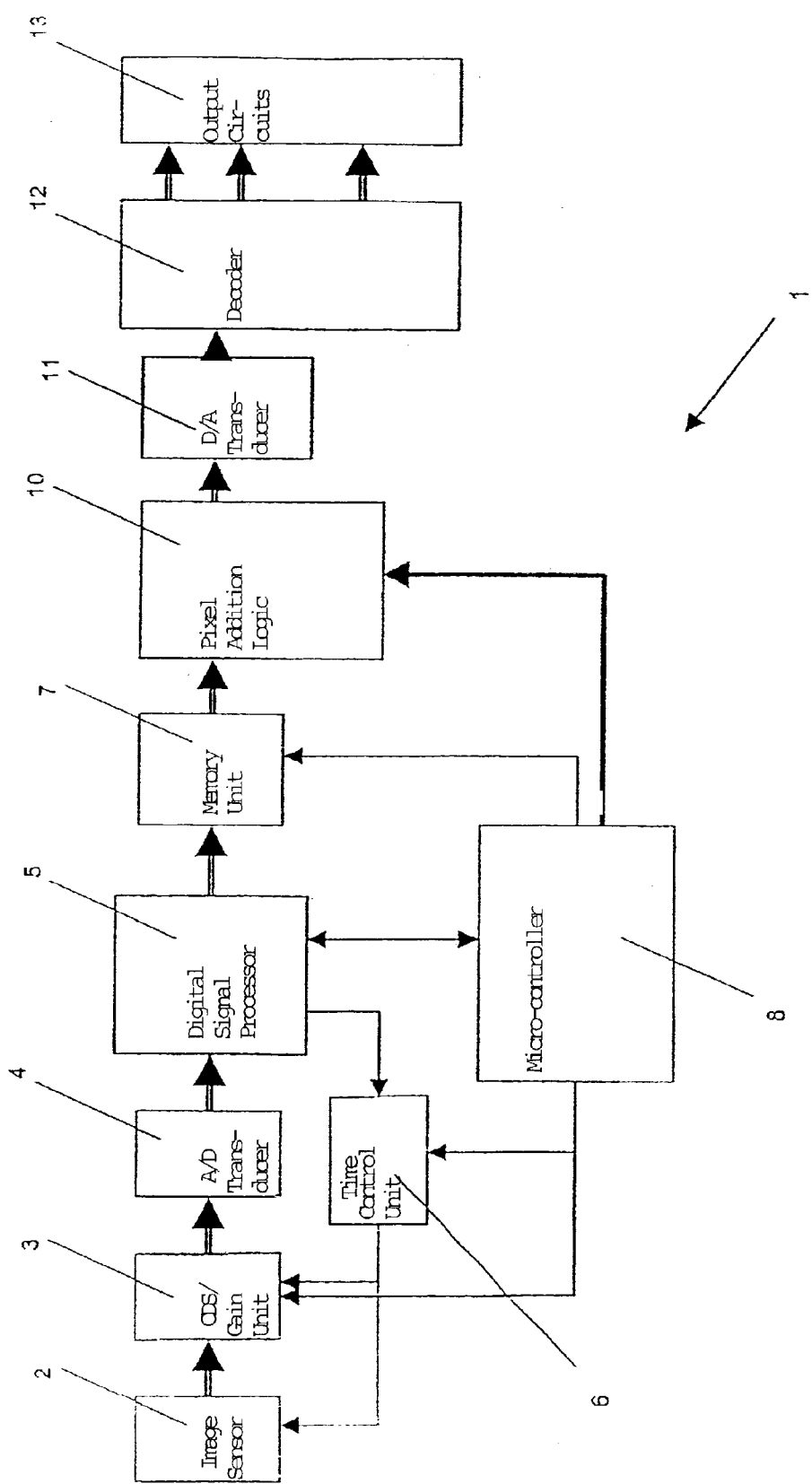
FIG. 1 is a block diagram of a solid-state video camera according to the present invention, comprising pixel addition logic controlled by a micro-controller.

The block diagram shown in FIG. 1 schematically shows a preferred embodiment of a solid-state video camera according to the invention, indicated generally with the reference numeral 1. In FIG. 1 the units 2-8 and 11-13 correspond to the already described blocks 22-28 and 31-33, respectively, of the conventional solid-state video camera shown in FIG. 4.

Figure 4:
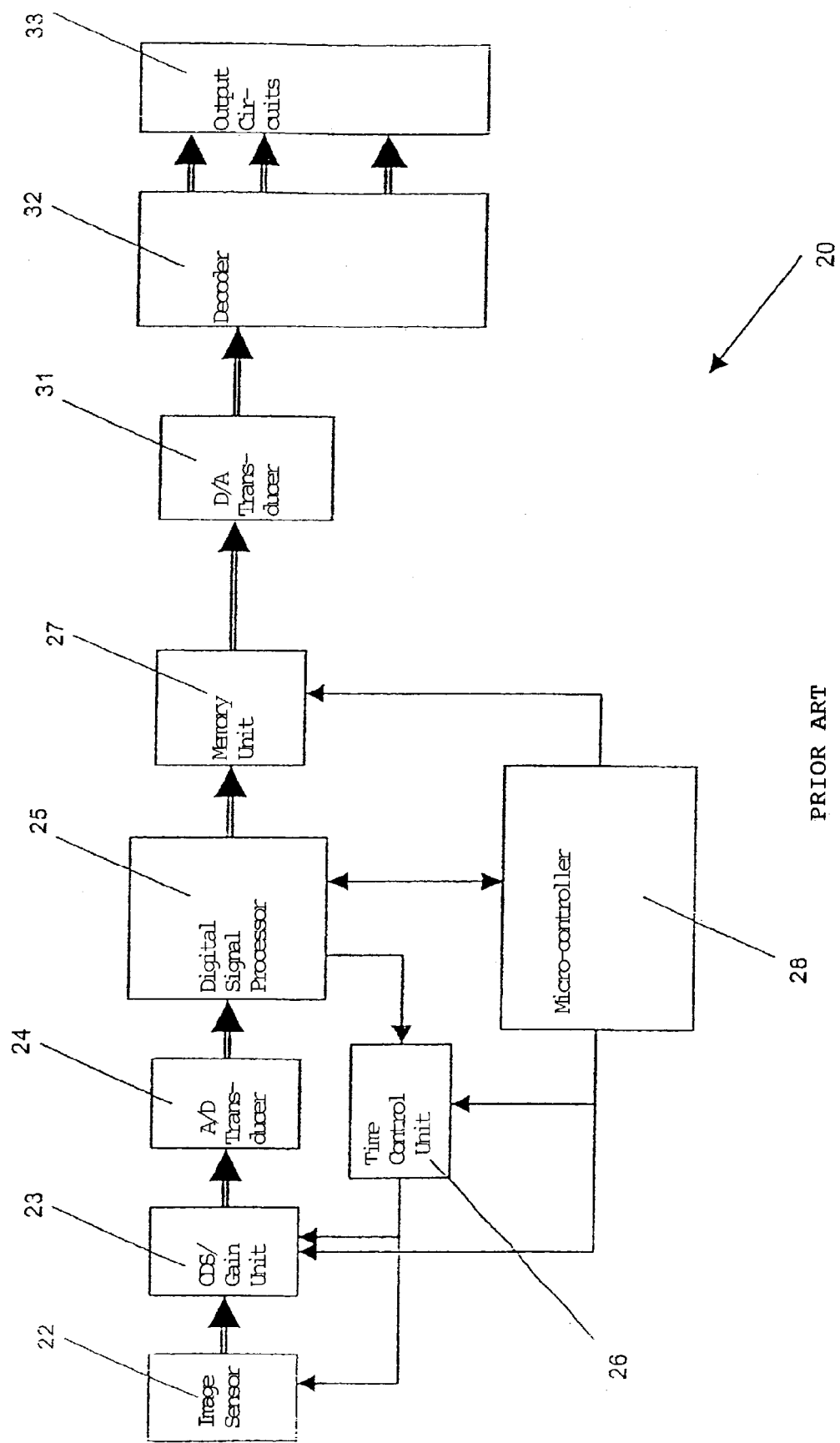
FIG. 4 is a block diagram of a solid-state video camera according to the prior art.

In addition to the structure shown in FIG. 4, the solid-state video camera 1 according to the invention and shown in FIG. 1 comprises pixel addition logic 10 controlled by the micro-controller 8. The control modes such as the pixel addition mode M1, the shutter mode M2, the gain control mode M3 and the optional image integration M4, which are integrated and combined in the solid-state video camera according to the invention, are realized by way of control algorithms or programs implemented in the micro-controller 8. For this, the micro-controller 8 is actively connected to the CDS/gain unit 3, the digital signal processor 5, the time control unit 6 and to the pixel addition logic 10. In FIG. 1 it is further shown that the optionally provided image memory unit 7 is controlled by the micro-controller 8.

The brightness control unit implemented in the micro-controller 8, in cooperation with the CDS/gain unit 3, the time control unit 6, the digital signal processor 5 and the pixel addition logic 10 provided according to the invention, permits a first (pixel addition) control mode M1.

The brightness control unit furthermore carries out a second control mode M2, specifically the shutter mode, which controls the exposure time of the pixels in predefined time steps. The brightness control unit automatically activates the pixel addition logic 10 if the measured object brightness with the longest possible shutter time (e.g. 1/50 s) of the shutter control mode M2 falls below a first threshold value S1.

Furthermore, the brightness control unit activates a third control mode M3, specifically a gain control, if the measured object brightness signal after activation of the pixel addition logic 10 falls below a third threshold value S3 which lies between first and second threshold values S1 and S2.

In an advantageous alternative embodiment, the number of addition steps in the pixel addition logic 10 which are activated by the brightness control unit in the first control mode M1 in each case may be set at the video camera.

Furthermore one may set the sequence of the first to fourth control modes M1 to M4 on the video camera 1. Alternatively, the image-integration envisaged as a third control mode M3 may be switched on or activated before the pixel addition envisaged as the first control mode M1. One may, however, also completely do away with the image integration.

Figure 2:
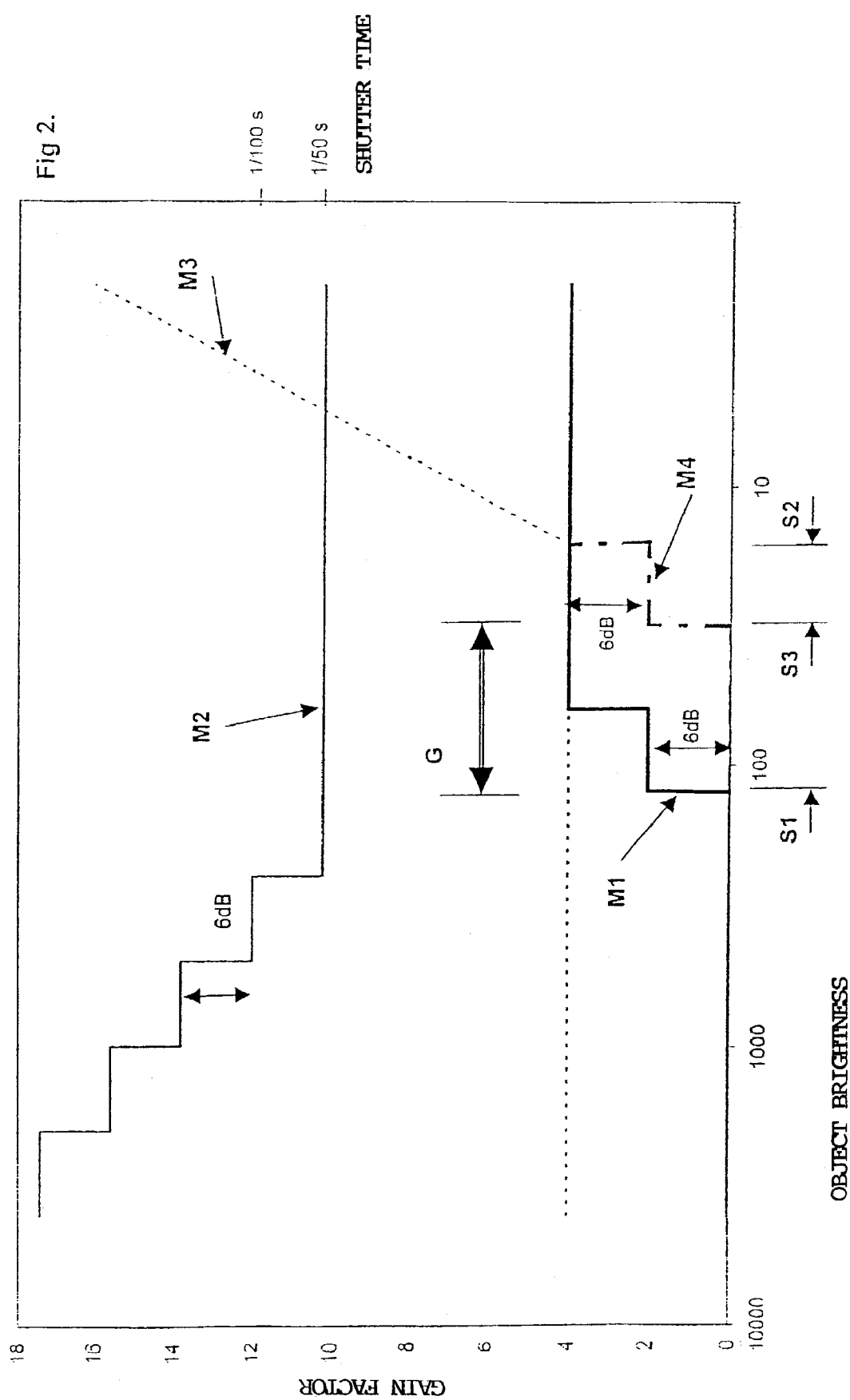
FIG. 2 is a graphical schematic representation of the course of the brightness control with the solid-state video camera shown in FIG. 1.

The diagram in FIG. 2 shows by way of a graphic example the course of a control according to the invention, which already contains the optional image integration. As in the already explained graph of FIG. 5, on the left vertical axis the gain factors have been plotted, and on the right vertical axis the shutter times are shown. The horizontal axis indicates the object brightness in relative units.

Figure 5:
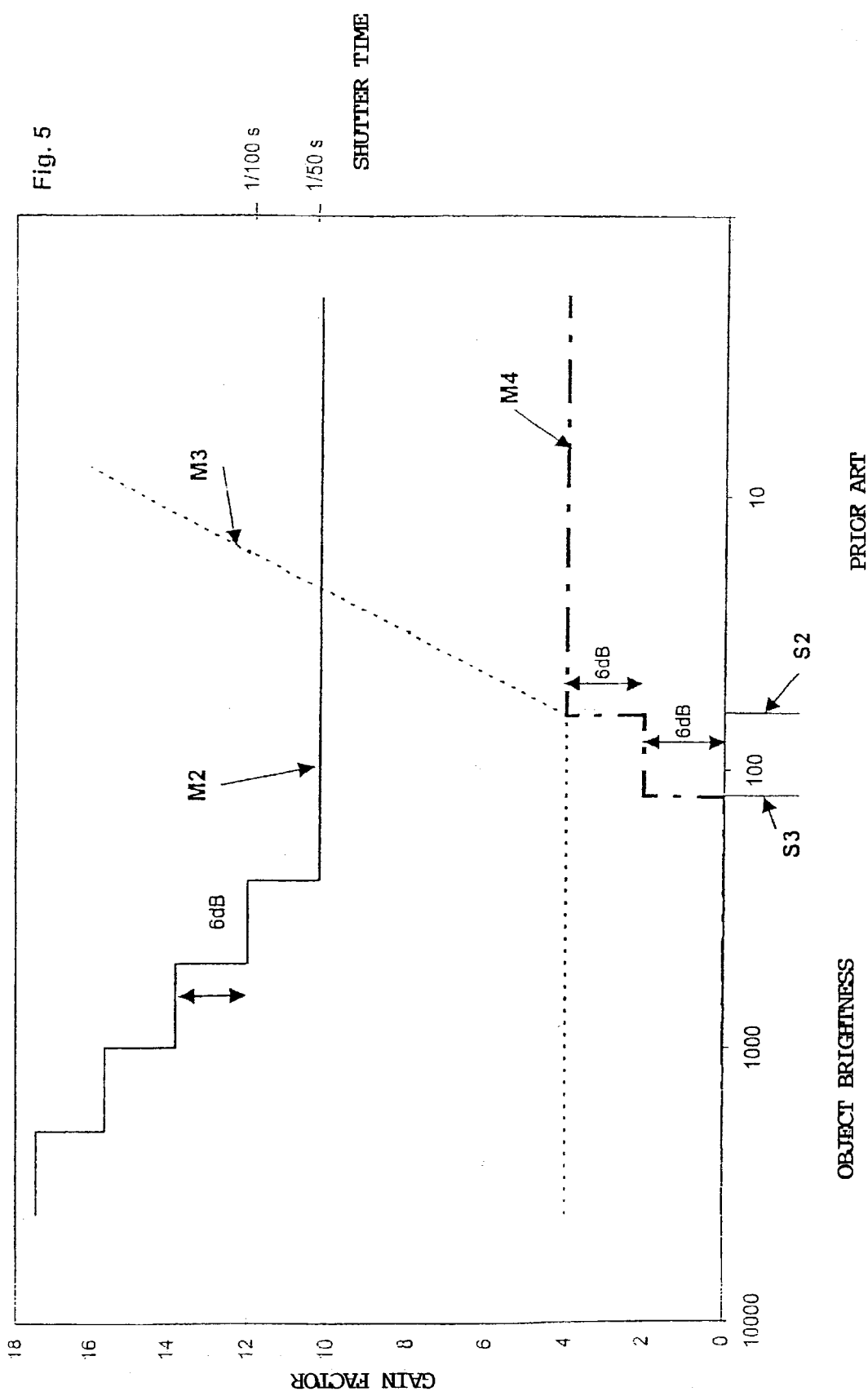
FIG. 5 is a graphical schematic of the course of the brightness control of the solid-state camera shown in FIG. 4.

As with the known method explained in FIG. 5 to reduce object brightness, as is indicated in the continuous graph M2, the shutter time is increased in steps. The 6 dB steps at the same time are only an example. If the measured object brightness decreases further after the shutter time may no longer be extended (longest shutter time 1/50 or 1/60 s) and the object brightness falls below a first threshold value S1, the brightness control unit, i.e. the micro-controller 8, activates the pixel addition as is represented with the continuous graphs M1. The activation of the pixel addition is effected before switching to the image integration. Here by way of example there are shown two pixel addition steps which in each case effect an increase of the image brightness by 6 dB. The gain of the dynamic scope, in which even a reduction of the noise component is achieved, is plotted as a double arrow G.

If the measured object brightness is further reduced, after it has fallen below a second threshold value S2, the gain control mode M3 sets in (as shown by the simple dashed line in FIG. 2). Optionally here a image integration (graph M4 shown dot-dashed) may be activated before activation of the gain control M3 if the object brightness falls below a third threshold value S3 which lies between the first threshold value S1 and the second threshold value S2.

Figure 3:
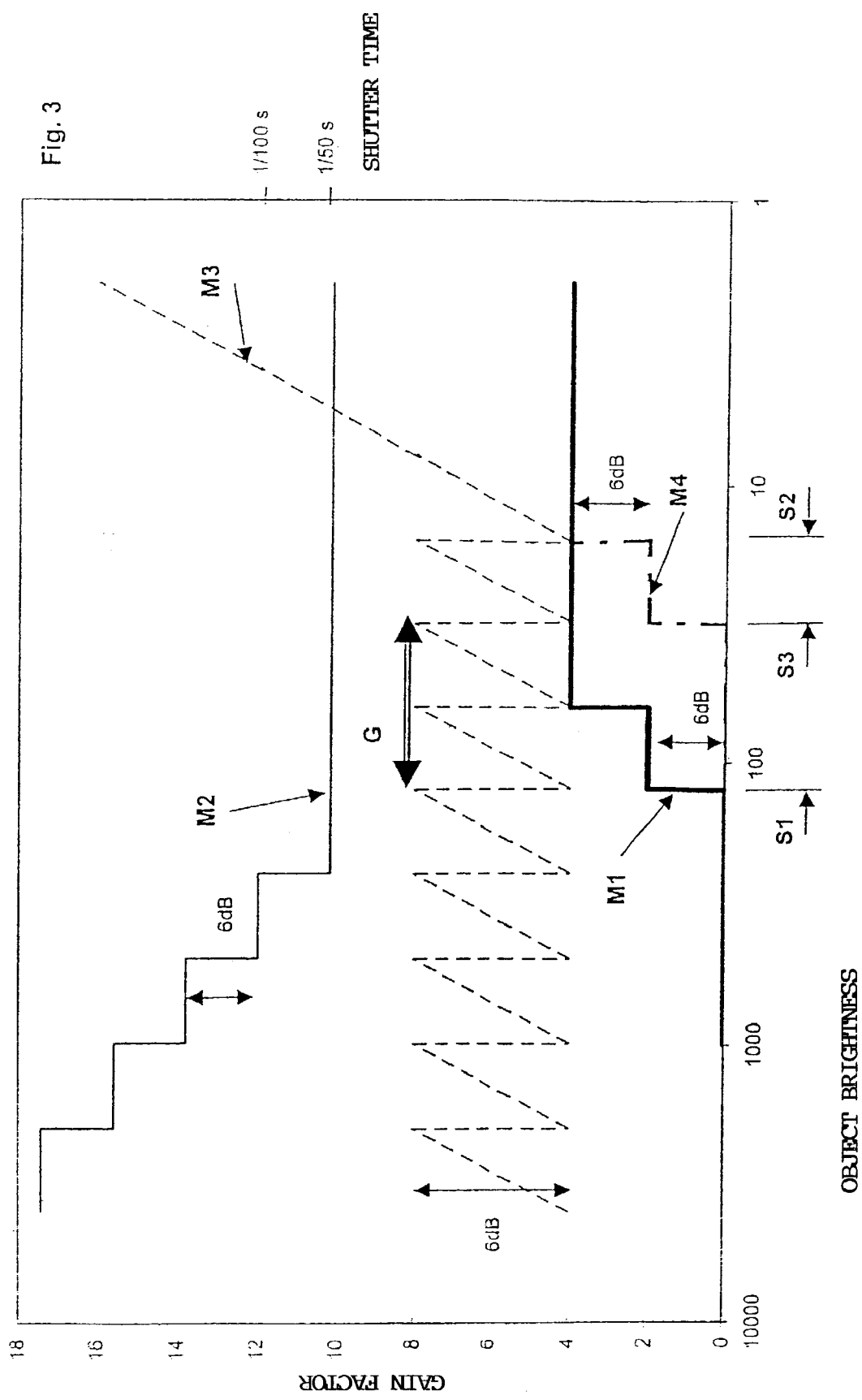
FIG. 3 is a graphical schematic of an alternative embodiment according to the present invention of the brightness control, which combines the amplifier control with a shutter control, the pixel addition and the optional long-term exposure in a manner such that a continuously controlled brightness transition is realized.

The method, which in each case is to compensate for jumps in brightness by way of a saw-tooth adaptation of the gain factor by the gain control, is improved even more according to the further formation of the brightness control function according to the invention shown in FIG. 3. In this alternative embodiment, the gain control M3 shown by the simply dashed graph is combined with the shutter control M2 shown by the continuous graph and with the control M1 by way of pixel addition, as well as optionally with the control M4 by way of image integration, in a manner such that between the brightness jumps which would arise on account of the switching-over of the shutter steps, addition steps and image integration steps, a continuous gain function is controlled. By way of this measure a particularly fine, continuous control of the image brightness over the whole dynamic range is achieved.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A solid-state video camera comprising:
   a brightness control unit which, based on a measured brightness signal of a video image, controls brightness of the image according to a nominal brightness value and has at least one brightness control mode, and
   pixel addition logic which operates on individual pixels of the image to independently increase the brightness of the individual pixels by grouping brightness information of several neighboring pixels, the pixel addition logic being in active connection with the brightness control unit.

2. The solid-state video camera of claim 1, wherein the brightness control unit combines the at least one brightness control mode in a manner such that, upon transition of the at least one brightness control mode into one another and/or within the at least one brightness control mode themselves, jumps in brightness are avoided.

3. The solid-state video camera of claim 1, wherein the pixel addition logic is designed as an uninterrupted pixel addition algorithm.

4. The solid-state video camera of claim 1, wherein the brightness control unit, using a longest possible shutter time of a second brightness control mode, automatically activates the pixel addition logic if the measured brightness signal falls below a first threshold value.

5. The solid-state video camera of claim 1, wherein the brightness control unit, in a third brightness control mode having a gain control, activates the gain control if the measured brightness signal, after activation of the pixel addition logic, falls below a second threshold value which is smaller than a first threshold value.

6. The solid-state video camera of claim 1, wherein the brightness control unit, in a fourth brightness control mode having image integration, activates the image integration if the measured brightness signal, after activation of the pixel addition logic falls below a third threshold value, wherein the third threshold value lies between first and second threshold values.

7. The solid-state video camera of claim 1, wherein the pixel addition logic comprises several addition steps, and the number of the addition steps activated by the brightness control unit in a first brightness control mode may be set on the video camera.

8. The solid-state video camera of claim 1, further comprising a micro-controller which controls the brightness control unit.

9. The solid-state video camera of claim 1, further comprising an image memory for carrying out long-term exposures.

10. The solid-state video camera of claim 9, wherein the pixel addition logic is connected after the image memory in the path of the video image.

11. A method for brightness control in a solid-state video camera, comprising:
    recording a video image using a solid-state image sensor,
    obtaining a brightness signal of the image, and
    controlling brightness of the image relative to a nominal value on the basis of at least one brightness control mode by providing a first brightness control mode which operates on individual pixels of the image to independently increase brightness of the individual pixels by grouping brightness information of several neighboring pixels.

12. The method of claim 11, further comprising providing a second brightness control mode having a shutter mode and controlling the brightness of the image by way of a stepwise setting of an exposure time of the pixels in the shutter mode.

13. The method of claim 12, further comprising automatically activating the first brightness control mode if, using a longest shutter time of the second control mode, the measured brightness signal falls short of a first threshold value.

14. The method of claim 11, further comprising providing a third brightness control mode having a gain control and activating the gain control if the measured brightness signal after activating the first brightness control mode falls below of a second threshold value which is smaller than a first threshold value.

15. The method of claim 11, further comprising combining the at least brightness one control mode in a maimer such that jumps in brightness are avoided on transition of the at least one brightness control mode into one another and/or within the at least one control mode themselves.

16. The method of claim 11, further comprising providing a fourth brightness control mode having image integration and activating the image integration if the measured brightness signal after activating the first brightness control mode falls below a third threshold value, wherein the third threshold value lies between first and second threshold values.

17. The method of claim 11, wherein the addition of brightness information of several neighboring pixels includes several addition steps, and the number of the addition steps activated in the first brightness control mode may be set.

* * * * *